Jan. 19, 1960 M. W. ALGER ET AL 2,921,729
CARDBOARD BERRY BOX
Filed May 15, 1957 2 Sheets-Sheet 1

Milton W. Alger
Earl M. Taylor
Thomas H. Alger
INVENTORS.

BY Clarence A. O'Brien
and Harvey B. Jacobson
Attorneys

Jan. 19, 1960
M. W. ALGER ET AL
2,921,729
CARDBOARD BERRY BOX
Filed May 15, 1957
2 Sheets-Sheet 2
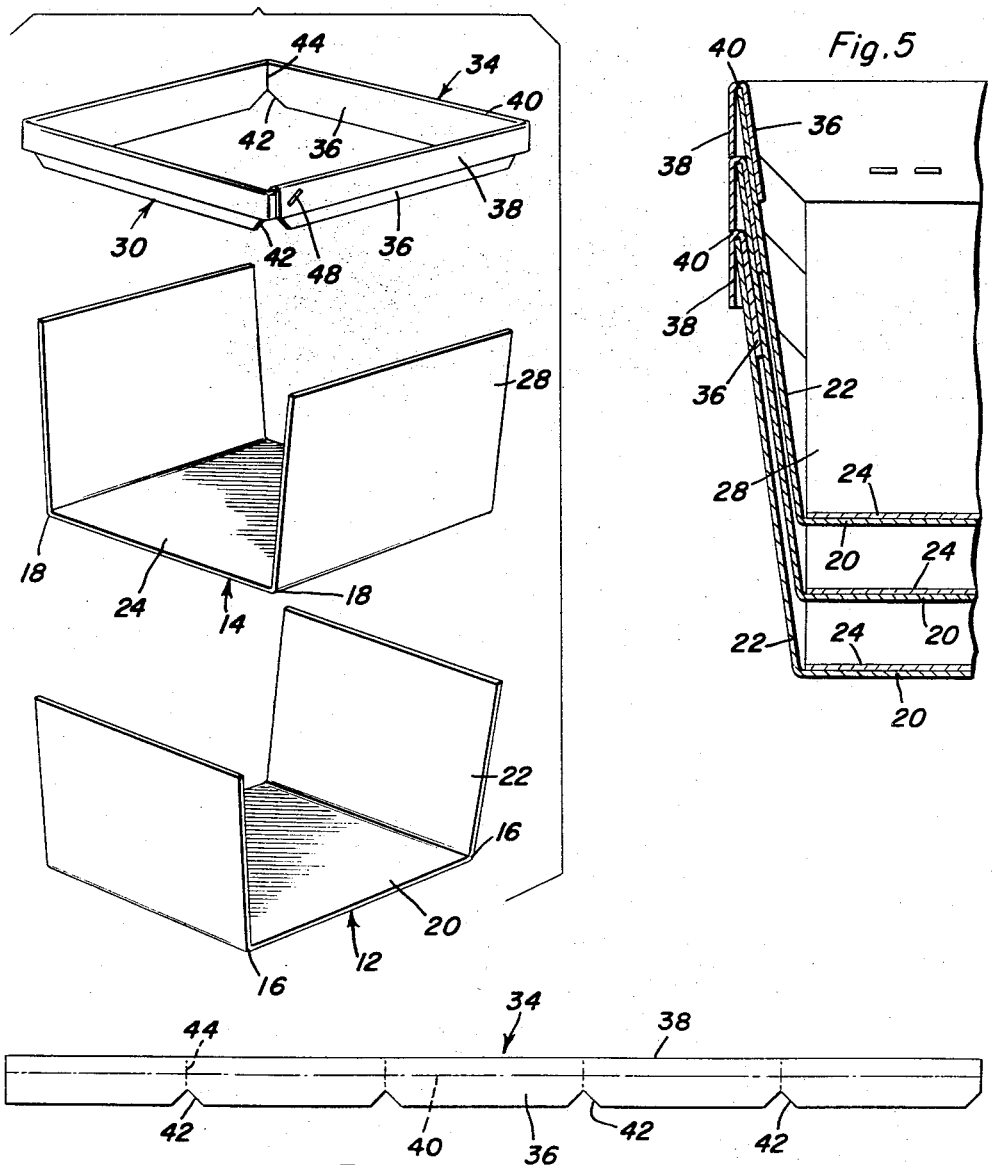
Milton W. Alger
Earl M. Taylor
Thomas H. Alger
INVENTORS.
BY *Clarence A. O'Brien*
*and Harvey B. Jackson*
Attorneys

United States Patent Office 2,921,729
Patented Jan. 19, 1960

2,921,729

CARDBOARD BERRY BOX

Milton W. Alger and Earl M. Taylor, Brockton, and Thomas H. Alger, Bridgewater, Mass.

Application May 15, 1957, Serial No. 659,252

2 Claims. (Cl. 229—23)

The present invention generally relates to a novel container construction and more particularly to a berry box constructed of cardboard.

An object of the present invention is to provide a cardboard berry box preferably constructed of waxed chip cardboard, the boxes being tapered in such a manner that the smooth surfaces thereof will permit easy nesting and unnesting.

In present practice, berries such as strawberries as well as many fruits are packed in wooden boxes of a tapered construction for distribution to prospective customers. These wooden boxes are subject to warpage, discoloration, deterioration and are exceedingly difficult to be unnested which at times results in cracking or breaking of some of the unused wooden boxes. Therefore, it is the primary object of the present invention to provide a berry box constructed of cardboard having a bottom of double thickness with outwardly inclined walls having a novel collar encircling the upper ends thereof, the grain of the cardboard extending vertically of each wall of the box for rigidifying the same and the grain of the collar extending horizontally for rigidifying the collar and retaining the walls in the desired position for proper nesting and for retaining or holding a measured amount of material for which the box is provided.

Yet another important object of the present invention is to provide a cardboard berry box having a reversely bent and substantially U-shaped collar at the upper edge thereof, the outer flange of the collar being free from the berry box for providing means for gripping and manipulating the berry box.

Other objects of the present invention will reside in its simplicity of construction, ease of nesting and unnesting, efficiency of use, adaptation for its particular purposes and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is a fragmentary sectional view showing a multiplicity of the berry boxes in nested relationship;

Figure 6 is an exploded group perspective view of the elements of the berry box showing the relationship of these elements; and Figure 7 is a developed plan view of the collar employed with the berry box of the present invention.

Figure 1:
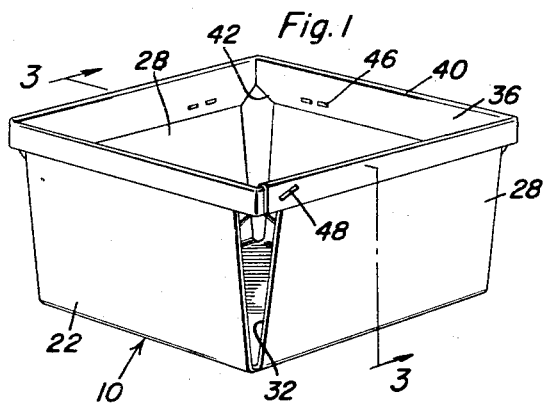
Figure 1 is a perspective view of the cardboard berry box of the present invention.
Figure 2:
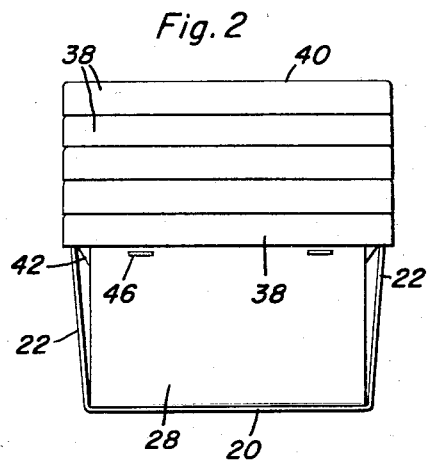
Figure 2 is a side elevational view of a plurality of berry boxes shown in nested relation.

Referring now specifically to the drawings, the numeral 10 generally designates the cardboard berry box of the present invention including a pair of elongated strips of cardboard material designated by numerals 12 and 14 respectively, the strips having the grain of the cardboard running longitudinally or lengthwise thereof. The strip 12 is creased at spaced parallel transverse lines 16 while the strip 14 is creased at spaced transverse parallel lines 18 thus dividing the strip 12 into a bottom member 20 and a pair of side members 22 and dividing the strip 14 into a bottom member 24 and a pair of side members 28, the side members 22 and 28 being inclined slightly outwardly so that when they are joined by a collar generally designated by numeral 30, the side edges of the side members 22 and 28 will be spaced and disposed in diverging relation for providing a substantially V-shaped opening or slot 32 at each corner of the box for permitting circulation of air through the strawberries or fruit contained within the box 10. In assembly, the two strips of cardboard 12 and 14 are purposely cut with the grain of the cardboard running lengthwise and the creases are made in such a manner to provide a uniformly square area for the bottom of the box and two uniform sides at the end portions of each strip. The two creased strips of paperboard are then placed one on top of the other with the grains running at right angles to each other and are glued, stitched or otherwise secured in the form of a flat cross with the center sections which form the bottom of the box coinciding with the creased lines. This arrangement provides all four sides of the box with a vertical grain when the box is completed in order to get the greatest possible stiffness in the four sides of the box and thereby result in a stronger and more rigid box which provides for uniform cubic content in a light material box having sufficiently improved ruggedness to withstand ordinary stresses of handling by farmers, shippers, retailers and ultimate consumers who may even store the berries in the original boxes in refrigerators or in freezers.

Figure 3:
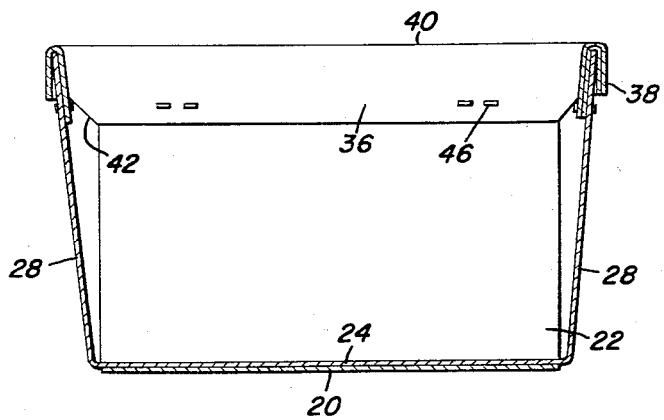
Figure 3 is a transverse, vertical sectional view taken substantially upon a plane passing along section line 3—3 of Figure 1 illustrating the details of construction of the berry box.
Figure 4:
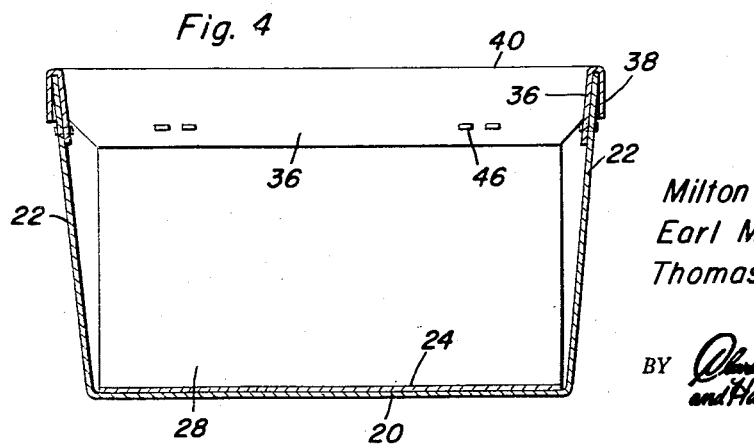
Figure 4 is a transverse sectional view taken upon a plane substantially at right angles to the plane of Figure 3 showing further structural details of the berry box.

The collar 30 is specifically shown in Figure 7 and is in the form of an elongated strip cut with the grain running lengthwise so that after the collar 30 is attached to the box at the top thereof, the grain runs in a horizontal direction. The elongated strip is generally designated by the numeral 34 and includes an inner flange 36 and an outer flange 38 interconnected by a bend 40 at the top edge thereof thus forming a rolled top edge. The lower edge of the inner flange 36 is provided with a plurality of equally spaced notches 42, the notches being four in number for coinciding with the corners of the box 10. Extending upwardly from each notch 42 is a vertical fold line 44, there being four vertical fold lines thus dividing the strip 34 into five sections, the end sections being disposed in overlapping relation when the collar 30 is assembled onto the upper edges of the side walls 22 and 28 which are received against the inner surface of the upper rolled edge 40 of the collar 34 substantially as illustrated in Figures 3–5. The lower edge of the inner flange 36 is stapled or wire stitched to the side walls 22 and 28. In the overlapping sections of the collar 30, the inverted U-shaped inner and outer portions 36 and 38 are merely disposed in superposed relation and are secured with a wire staple fastener or wire stitching. The wire staples are designated by the numeral 46 and it is noted that the free end of the collar 30 is secured in position by a single fastening element such as wire staple fastener 48 extending inwardly from the outer surface thereof. The lower edge of the outer flange 38 is purposely left unattached for providing a hand-hold for lifting and handling the berry box.

The four inverted V-shaped cuts or notches 42 are disposed at the four corners of the box to allow the boxes to nest compactly and completely with the top edge of one collar touching against the bottom of the outer flange of the collar of the next upper box. The collar is folded with the grain running lengthwise in a manner to completely cover the four sides of the box and to extend the length of one full side in addition thereto, the collar being secured at the outside end to keep the outside end of the collar from moving outwardly. The collar maintains the side walls in the desired position so that the box will taper from the bottom outwardly and upwardly to a predetermined perimeter to allow for the desired cubic content of the box. The fact that the collar is folded vertically at the creases 44 gives a collar with much greater strength than one which has been cut and also gives a very smooth surface for handling and leaves no sharp edges to damage the berries contained in such a box which sometimes begins or initiates spoilage of the berries. The inner flange 36 is deeper than the outer flange 38 for permitting the wire stitching of the collar to the box and by leaving the exterior flange free, the lower edge thereof will naturally bow away from the sides of the assembled box so that the bowed portion furnishes a maximum of rigidity which would be lost if the exterior flange were stitched to the sides of the box.

The assembled box made of waxed paperboard is absolutely smooth on all four sides thereof and provides for perfect nesting and efficient unnesting without breakage, catching or splitting as occurs with wooden boxes.

The boxes may be made in various color combinations depending upon the type of berries or fruit to be used therein and the coloring may be carried out in any suitable manner and it is also pointed out that these boxes may be constructed in various sizes depending upon the desired volumetric content.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a berry box, the combination of two elongated cardboard members disposed in crossing relation and having upturned end portions forming the sides of the box and superposed intermediate portions forming the box bottom of double thickness, and a collar extending perimetrically at the top of said sides, said collar comprising a cardboard strip doubled upon itself along a longitudinal fold line spaced unequally from opposite side edges of the strip whereby one folded side portion of the strip is wider than the other, upper edge portions of said sides being disposed within the folded strip with said relatively wider folded side portion of the strip at the inside of the box and the relatively narrower side portion at the outside of the box, and fastening elements securing said relatively wider side portion of said strip to said sides at points spaced downwardly from the relatively narrower side portion, said narrower side portion of the strip being detached from said sides and movable outwardly therefrom to provide handle means for the box.

2. The device as defined in claim 1 wherein the end portions of said folded strip are overlapped at one side of the box whereby one end of the strip is concealed within the other end portion and only the other end of strip is exposed, and a fastening element securing said exposed end of the strip to the adjacent side of the box.

References Cited in the file of this patent

UNITED STATES PATENTS

| | | |
|---|---|---|
| 119,872 | Marvil | Oct. 10, 1871 |
| 249,561 | Weston | Nov. 15, 1881 |
| 398,739 | Lettelier | Feb. 26, 1889 |
| 1,513,608 | Labombarde | Oct. 28, 1924 |
| 1,925,482 | Croce | Sept. 5, 1933 |